United States Patent [19]
Jeromin et al.

[11] Patent Number: 5,127,038
[45] Date of Patent: Jun. 30, 1992

[54] METHOD FOR CAPTURING AND DISPLAYING A LATENT RADIOGRAPHIC IMAGE

[75] Inventors: Lothar S. Jeromin, Newark, Del.; Denny L. Y. Lee, West Chester, Pa.

[73] Assignee: E. I. Du Pont de Nemours and Company, Wilmington, Del.

[21] Appl. No.: 723,314

[22] Filed: Jun. 28, 1991

[51] Int. Cl.$^5$ .............................. G03G 13/44
[52] U.S. Cl. ................................ 378/28; 378/31
[58] Field of Search ............... 378/28, 32, 33, 19, 378/62, 31

[56] References Cited

U.S. PATENT DOCUMENTS

| | | | |
|---|---|---|---|
| 2,866,903 | 12/1958 | Berchtold | 378/28 |
| 4,030,922 | 6/1977 | Honjo et al. | 378/28 |
| 4,085,327 | 4/1978 | Swank et al. | 250/370 |
| 4,134,137 | 1/1979 | Jacobs et al. | 358/293 |
| 4,176,275 | 11/1979 | Korn et al. | 250/213 R |
| 4,268,750 | 5/1981 | Cowart | 250/315.1 |
| 4,446,365 | 5/1984 | Ong et al. | 250/213 R |
| 4,508,966 | 4/1985 | Oberschmid et al. | 250/327.2 |
| 4,521,808 | 6/1985 | Ong et al. | 358/111 |
| 4,535,468 | 8/1985 | Kempter | 378/31 |
| 4,539,591 | 9/1985 | Zermeno et al. | 358/335 |
| 4,554,453 | 11/1985 | Feigt et al. | 250/327.2 |
| 4,663,526 | 5/1987 | Kamieniecki | 250/315.3 |
| 4,818,857 | 4/1989 | Micheron | 250/213 R |
| 4,857,723 | 8/1989 | Modisette | 250/213 R |
| 4,961,209 | 10/1990 | Rowlands | 378/29 |
| 4,975,935 | 12/1990 | Hillen et al. | 378/28 |

Primary Examiner—Janice A. Howell
Assistant Examiner—Don Wong

[57] ABSTRACT

A method for capturing and displaying radiographic images. More particularly, the present invention uses a unique microcapacitor matrix structure to hold varying electrical charges representing a latent radiographic image which are subsequently rendered visible through toning.

7 Claims, 4 Drawing Sheets

METHOD FOR CAPTURING AND DISPLAYING A LATENT RADIOGRAPHIC IMAGE

BACKGROUND OF THE INVENTION

1. Field of the Invention

The present invention relates to a method for capturing and displaying radiographic images. More particularly, the present invention uses a unique microcapacitor matrix structure to hold varying electrical charges representing a latent radiographic image which are subsequently rendered visible through toning.

2. Description of Related Art

Traditional radiography employs a silver halide photosensitive film in a light tight cassette enclosure to capture a latent radiographic image which is subsequently rendered visible following chemical development and fixing. Because silver halide film is not very sensitive to X-ray radiation, and large exposures are required to obtain an image, most applications use a combination of an intensifying screen incorporated in the cassette with the silver halide film to achieve lower exposures. Intensifying screens typically comprise a phosphor layer coated over a supporting substrate. As a result of the impingement of X-ray radiation, the phosphor layers emit photons. The emitted photons, i.e., the light intensity output, are proportional to the X-ray energy level absorbed by the phosphor particles in the screen. The film sensitivity is adjusted to match the color output of the phosphor. The phosphor layer has a greater thickness than typical film emulsion and increased X-ray stopping efficiency. The overall response of the combined film screen system is thus greatly enhanced. In practice, X-ray films are often coated on both sides with photosensitive emulsion and two screens are used to expose the film from both sides, further increasing the efficiency of the system and reducing the exposure time required to obtain a radiogram.

Radiograms have also been produced by capturing a latent radiographic image using a photoconductive plate in a xeroradiographic process. In this instance, a photoconductive plate sensitive to X-ray radiation comprising at least a photoconductive layer coated over a conductive backing layer is first charged by passing under a charging station typically comprising a corona wire. Positive or negative charge is uniformly deposited over the plate surface. The plate is next exposed to X-ray radiation. Depending on the intensity of the incident radiation, electron hole pairs generated by the X-ray radiation are separated by a field incident to the charge laid over the surface and as a result move along the field to recombine with the surface charge. After X-ray exposure, a latent image in the form of electrical charges of varying magnitude remain on the plate surface, representing a latent electrostatic radiogram. This latent image may then be rendered visible by toning and preferably transferring onto a receiving surface for better viewing.

Xeroradiography, a specific application of electroradiography offers high resolution and, because the photoconductive layer may be made fairly thick comparative to the the phosphor screens, results in good X-ray conversion efficiency. It is, however, limited by the same limitations found in xerography in general, i.e., dynamic range and the complexity of processing equipment. Long term image storage is subject to dark charge leakage, and handling of the charged and imaged plate in the presence of actinic radiation is not possible.

More recent developments include the use of an electrostatic image capture element to capture a latent X-ray image, the element comprising a photoconductive layer ,over an insulating layer on a conductive support, the photoconductive layer also covered by a dielectric layer, and the dielectric layer overcoated with a transparent electrode. A biasing voltage is applied between the transparent electrode and the conductive support to charge the element which is a large parallel plate capacitor. While the bias voltage is applied, the element is exposed to image wise modulated X-ray radiation. Following exposure, the bias is removed and a latent image is preserved as a charge distribution trapped in the dielectric layer. The problem with this element structure is that the latent image represented by local charge variations is a very small signal charge that must be extracted in the presence of random noise in the total capacitive charge in the full plate. Signal to noise ratio is typically poor.

In an effort to improve the signal to noise ratio, the transparent electrode is laid over the dielectric layer as a plurality of parallel narrow strips. In this manner the overall plate capacity is reduced and the signal extracted per picture element has a better signal to noise ratio. Methods to readout the latent image include inter alia, scanning the length of the strip electrode with a laser beam while reading the charge flow across the electrode and the conductive plate. While this element is a vast improvement over the continuous electrode structure covering the full plate, the signal to noise ratio is still a problem because of the relatively high dark current leakage under the electrode strip. Thus, an X-ray capture system based on this element structure still suffers in image quality.

SUMMARY OF THE INVENTION

It is an object of the present invention to provide a method for capturing and rendering visible a radiogram on an X-ray image capture element, comprising:

a first, electrically conductive, backing layer;

a second, photoconductive layer responsive to both actinic and X-ray radiation extending substantially over said backing layer;

a third, dielectric layer substantially transparent to both actinic and X-ray radiation, the dielectric layer having a front surface and a back surface extending substantially over and in contact with said photoconductive layer; and a plurality of discrete conductive microplates substantially transparent to both actinic and X-ray radiation, said microplates on said front surface, each of said microplates having dimensions coextensive with a minimum resolvable picture element; the method comprising:

(a) preventing actinic radiation from impinging on the element;

(b) applying an electric potential difference between the plurality of microplates and the backing layer;

(c) impinging imagewise modulated X-ray radiation for a first time period onto the element;

(d) after the first time period, stopping the applying step; and (e) toning the plurality of microplates with an electrostatic toner.

The first, second and third layers may be continuous layers, and a charge barrier layer may also be placed between the first conductive, backing layer and the photoconductive layer.

It is also a further object of the present invention to provide a method for rendering visible a radiogram which comprises in addition to the hereinabove described steps the additional step of transferring said toner to a receiving surface.

DESCRIPTION OF THE PREFERRED EMBODIMENTS

Figure 1:
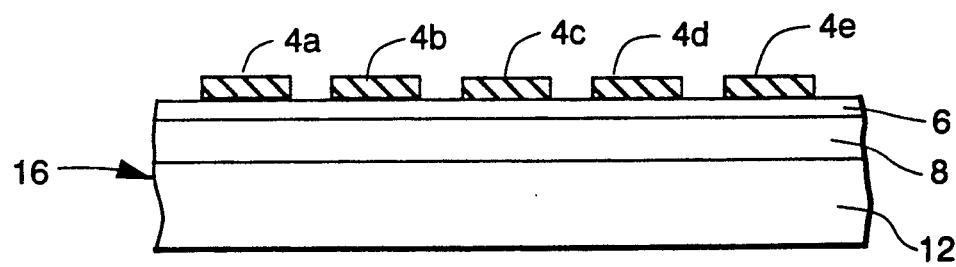
FIG. 1 shows a schematic cross sectional view of an X-ray capture element in accordance with the present invention.

Referring now to the drawings, in FIG. 1, an X-ray image capture element 16 has a first conductive backing layer 12. This conductive backing layer 12 is made of conductive material, and may be rigid or flexible, transparent or non transparent. Preferably it is a continuous layer made of a sufficiently thick and rigid conductive material to serve as support for the other layers that comprise the image capture element 16. In its simpler structure, there is coated over the conductive backing layer 12 a photoconductive layer 8 having a back surface in contact with the conductive backing layer, and a front surface. The photoconductive layer 8 preferably exhibits very high dark resistivity.

The photoconductive layer 8 may comprise amorphous selenium, lead oxide, cadmium sulfide, mercuric iodide or any other such material, including organic materials such as photoconductive polymers preferably loaded with X-ray absorbing compounds, which exhibit photoconductivity.

In the context of the present invention, exhibiting photoconductivity means that upon exposure to actinic or X-ray radiation, the material exhibits reduced resistivity than in the absence of such exposure. The reduced resistivity is in reality the effect of electron hole pairs generated in the material by the incident radiation. Preferably, the change in apparent resistivity is proportional to the intensity of the incident radiation. By actinic radiation, again for purposes of describing the present invention, is meant ultraviolet (U.V.), infrared (I.R.) or visible but excludes X-ray and gamma radiation.

The photoconductive layer 8 should be chosen of sufficient thickness to absorb the incident X-ray radiation, or a substantial portion thereof, to provide high efficiency in radiation detection. The specific type of material selected will further depend upon the desired charge retention time, and the desired simplicity of manufacture. Selenium is one preferred such material.

Over the front surface of photoconductive layer 8 there is applied a dielectric layer 6. The dielectric layer 6 must be transparent to both X-ray and actinic radiation and have sufficient thickness to prevent charge leakage. In the preferred embodiment of the present invention, the dielectric layer 6 should have a thickness greater than 100 Angstroms. Mylar ® with a thickness of 50 $\mu$m may be used for layer 6, although thinner layers are suitable.

Figure 2:
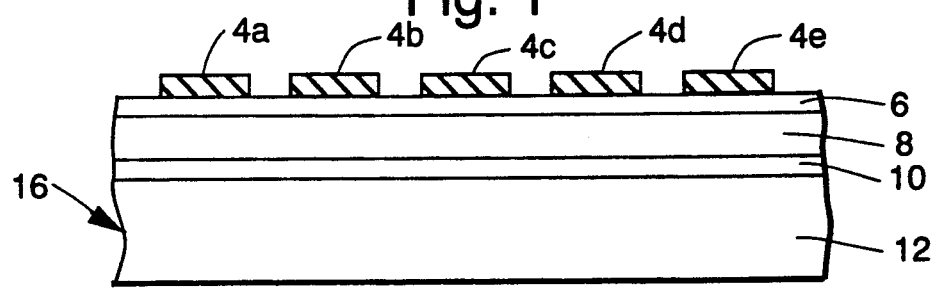
FIG. 2 shows a schematic cross sectional view of an alternate embodiment of an X-ray capture element in accordance with the present invention incorporating a charge barrier layer.
Figure 2A:
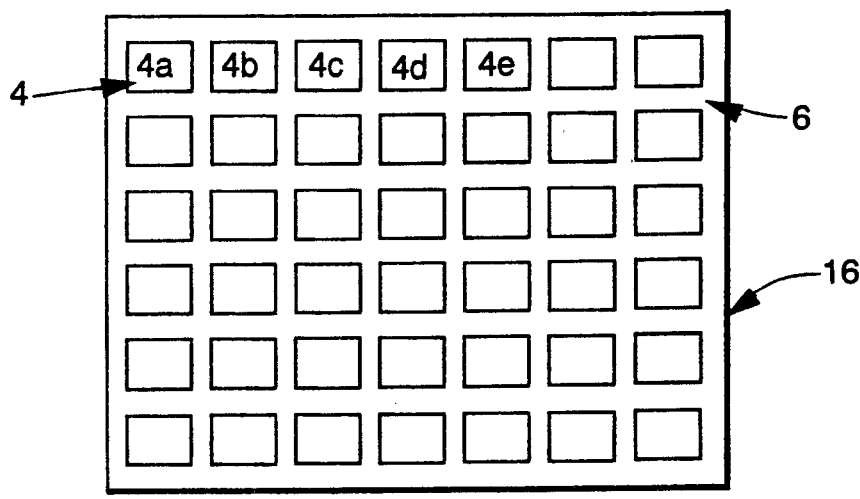
FIG. 2a is a top view of the embodiment of the X-ray capture element shown in FIG. 2.

As shown in FIGS. 1, 2 and 2a, over the dielectric layer 6 there is created a plurality of discrete minute conductive electrodes, 4a, 4b, 4c, etc., referred to herein as microplates. The dimensions of the microplates define a smallest picture element (PIXEL) resolvable by this element 16. The electrodes 4a, 4b, 4c, etc., are substantially transparent to both actinic and X-ray radiation. They are deposited on the dielectric layer 6, typically, though not necessarily, using vapor or chemical deposition techniques, and can be made of a very thin film of metal such as gold, silver, aluminum, copper, chromium, titanium, platinum and the like. Preferably the microplates 4a, 4b, 4c, etc., are made of transparent indium-tin oxide. The microplates 4a, 4b, 4c, etc., are normally deposited as a continuous layer which is then etched to produce a plurality of individual discrete microplates having dimensions coextensive with the smallest resolvable picture element. The microplates 4a, 4b, 4c, etc., may also be produced using laser ablation or photoetching. The technology to produce such microplates is well known in the art and is not further discussed herein. A good description of photomicrofabrication techniques is given in *Imaging Processing & Material*, chapter 18, entitled "Imaging for Microfabrication", P. 567 by J. M. Shaw of IBM Watson Research Center.

The combination of each one of the microplates 4a, 4b, 4c, etc., with the dielectric layer 6, the photoconductive layer 8, and the backing conductive layer 12 form two microcapacitors in series, a first microcapacitor being created between the microplate and the front surface of the photoconductive layer 8 and a second microcapacitor between that same surface and the conductive backing layer 12.

In an alternate and preferred structure, shown in FIG. 2, a charge barrier layer 10, is added on top of the conductive layer 12. Preferably, the base plate or layer 12 is made of an oxide forming metal such as aluminum, and the charge barrier layer 10 is provided by an aluminum oxide layer formed on the surface of the base plate or layer 12. In this case, the subsequent coating thereon of a selenium photoconductive layer 8 produces a barrier layer 10 behaving as a blocking diode, inhibiting charge flow in one direction.

The charge barrier layer 10 may also be a simple insulating layer such as Polyethylene Terephthalate (Mylar®), of dimensions comparable to the dielectric layer 6.

Dielectric layer 6, substantially transparent to both X-ray and actinic radiation and having sufficient thickness to prevent charge leakage, is placed over the front surface of photoconductive medium layer 8. Transparent, discrete, microplates or electrodes 4a, 4b, 4c, etc., are formed over the dielectric layer 6 as before.

The entire element 16 can be made by depositing successive layers of conductor, insulator, photoconductor, insulator, and conductor upon a substrate. Assembly may be accomplished by vapor deposition, vacuum deposition, lamination, sputtering or any other known technique useful to deposit even thickness films.

In the preferred embodiment, the conductive backing layer 12, the charge barrier layer 10, the photoconductive layer 8 and the dielectric layer 6 are all continuous layers. However, it is still within the contemplation of the present invention to manufacture an element for X-ray capture as herein above structured, in which not only the transparent electrode layer has been etched to produce a plurality of microplates 4a, 4b, 4c, etc., but one or more of the underlying layers 6, 8, 10 and 12 may also be etched with substantially the same pattern as the electrode layer, to form a plurality of discrete dielectric portions, photoconductive portions, barrier layer portions or even conductive portions lying below the microplates 4a, 4b, 4c, etc., in registration therewith. Furthermore, rather than etching a continuous layer to generate the microplates 4a, 4b, 4c, etc., direct deposition of the microplates 4a, 4b, 4c, etc., using masking techniques may be used, the method of manufacturing being one of choice depending on available resources and cost considerations rather than an essential element or step of the present invention.

Figure 3:
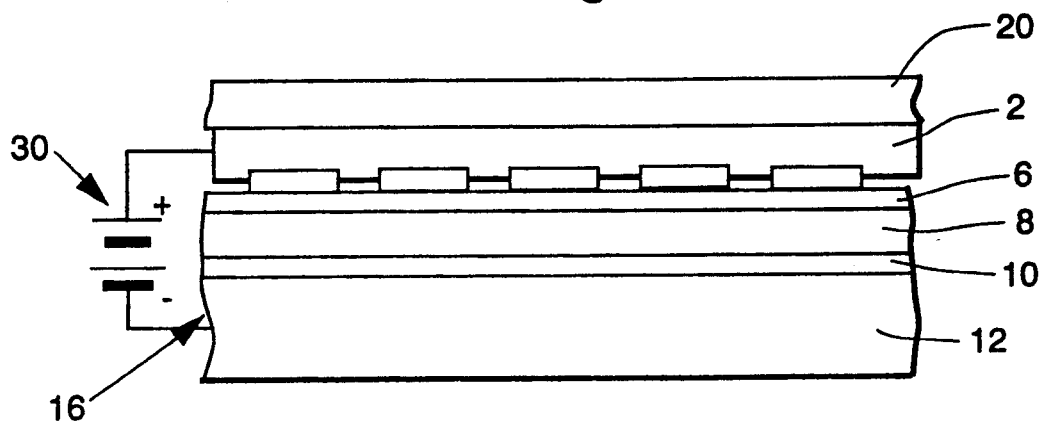
FIG. 3 shows a schematic cross sectional view of a device for capturing a latent X-ray image in accordance with the present invention.

The element of FIG. 1 or 2 is preferably used in a device of the type shown in FIG. 3 to capture a latent X-ray image in a manner somewhat similar to the use of traditional silver halide film in a screen containing cassette. Such a device comprises in addition to an element for x-ray capture as described above, additional layers 2 and 20. Layer 2 is a conductive contacting layer which, in order to assure good electrical contact is preferably a resilient conductive layer, such as conductive foam, conductive velvet or conductive rubber. The use of the term resilient herein includes flexible layers. Layer 2 is movable between two positions, a first position in contact with the microplates 4a, 4b, 4c, etc., and a second position, not shown in the Figures, away from the microplates 4a, 4b, 4c, etc. This resilient layer 2 is preferably affixed onto a rigid supporting layer 20. Layers 20 and 2 are substantially transparent to X-ray radiation.

An electrical bias source 30 is connected to the backing electrode 12 and the conductive resilient layer 2 to apply a DC bias voltage across the element 16.

Figure 10:
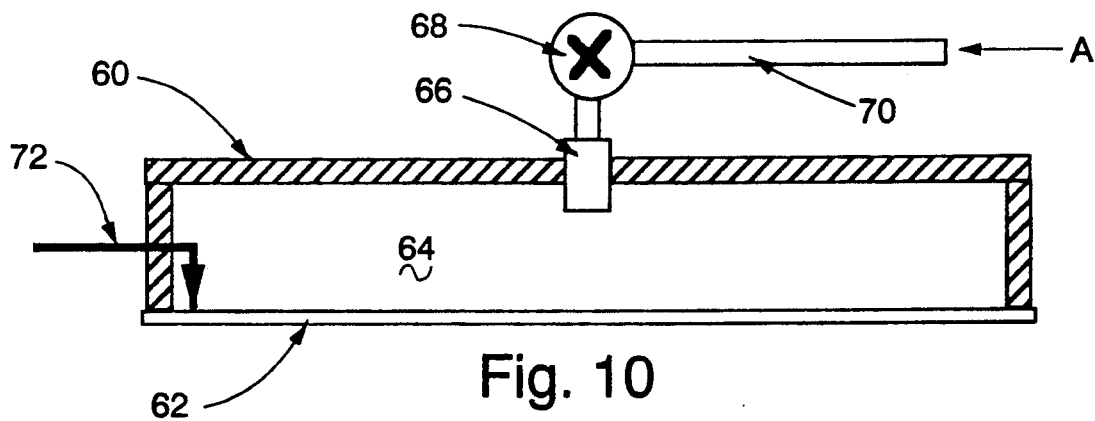
FIG. 10 is a schematic representation of a preferred arrangement of a resilient conductive contacting layer with pneumatic backing.

In a preferred embodiment, the conductive layer 2 comprises a conductive membrane 62 mounted on a framework which allows the application of pressure from a back side of the membrane 62 by injection of a fluid medium, such as air. FIG. 10 shows such a possible structure which may be incorporated as an integral part of a cassette 22 shown in FIG. 4 and discussed in detail below. The structure comprises a supporting enclosure 60 which is preferably airtight, and which supports on its lower end the flexible conductive membrane 62. The membrane may be conductive rubber. Contact means 72 are available to provide a path for connecting an external electrical bias source, i.e., source 30 which is not shown in FIG. 10, to the membrane 62. An orifice means 66 through a valve 68 allows one to supply the fluid medium to chamber 64 formed by the airtight enclosure 60 and the flexible membrane 62. This structure results in a support for the membrane 62 that exhibits good and uniform flexibility and resiliency, assuring that each and everyone of the microplates 4a, 4b, 4c, etc., is contacted by the conductive layer 62.

In an alternate embodiment, the contacting layer 2 may comprise a layer of ionized gas contained in an enclosure covering the top surface of the element 16 to provide electrical contact between the microplates 4a, 4b, 4c, etc., and the bias source 30. The ionization of the gas may be achieved using a two dimensional corona device which may be built within an enclosure which may also be built as an integral part of cassette 22.

Figure 4:
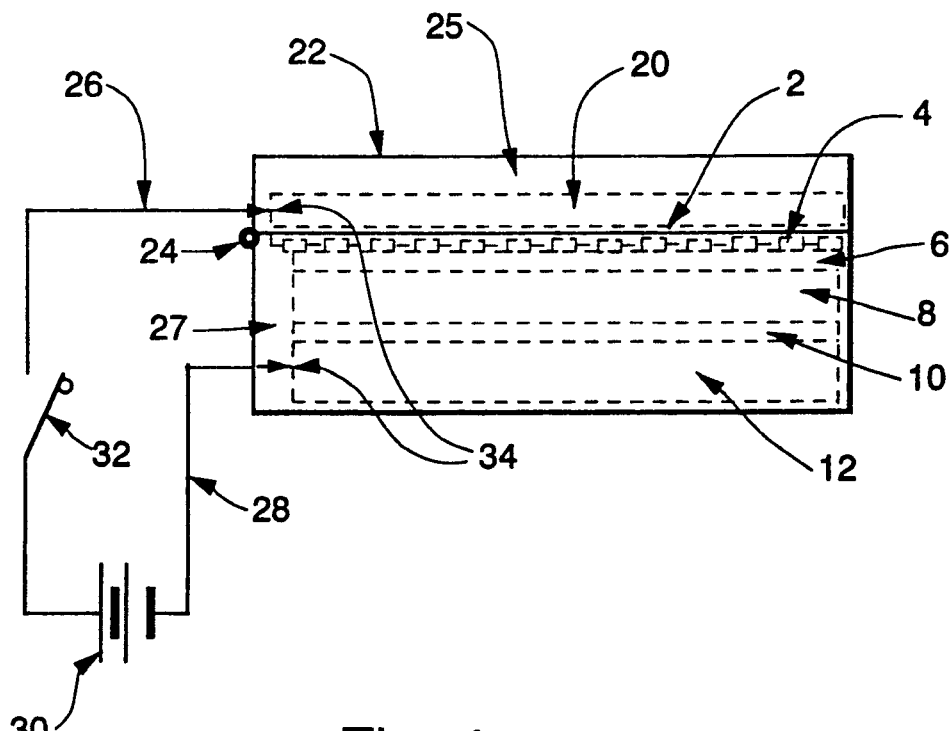
FIG. 4 depicts a schematic representation of the device of FIG. 3 in an enclosure to protect the device from exposure to actinic radiation.

In use, the device described may include a cassette enclosure to shield the element 16 from exposure to actinic radiation, much in the manner a cassette shields an X-ray film. FIG. 4 shows such an arrangement in which a cassette-like enclosure 22 is used. The cassette enclosure 22 is made of material which is opaque to ambient actinic radiation but transparent to X-rays. Since the ambient levels of gamma radiation are not usually high enough to present any exposure problems, it is not necessary that the material be opaque to gamma radiation. Similarly, in the absence of ambient IR radiation the enclosure need not be opaque thereto.

The enclosure 22 may include a hinge 24 hingedly connecting a top section 25 and a bottom section 27, allowing the cassette 22 to open and close at will. Within the top section 25, there is affixed supporting layer 20 and conductive contacting layer 2.

The cassette 22 further includes electrical connecting means 34 which permits one to connect power source 30 via wiring 26 and 28 to the conductive layer 2 and the conductive backing 12. Supporting layer 20 may also be conductive to facilitate the connection arrangement. A switch 32 is optionally provided to permit applying and stopping the applying of a bias voltage to the cassette 22.

Figure 5:
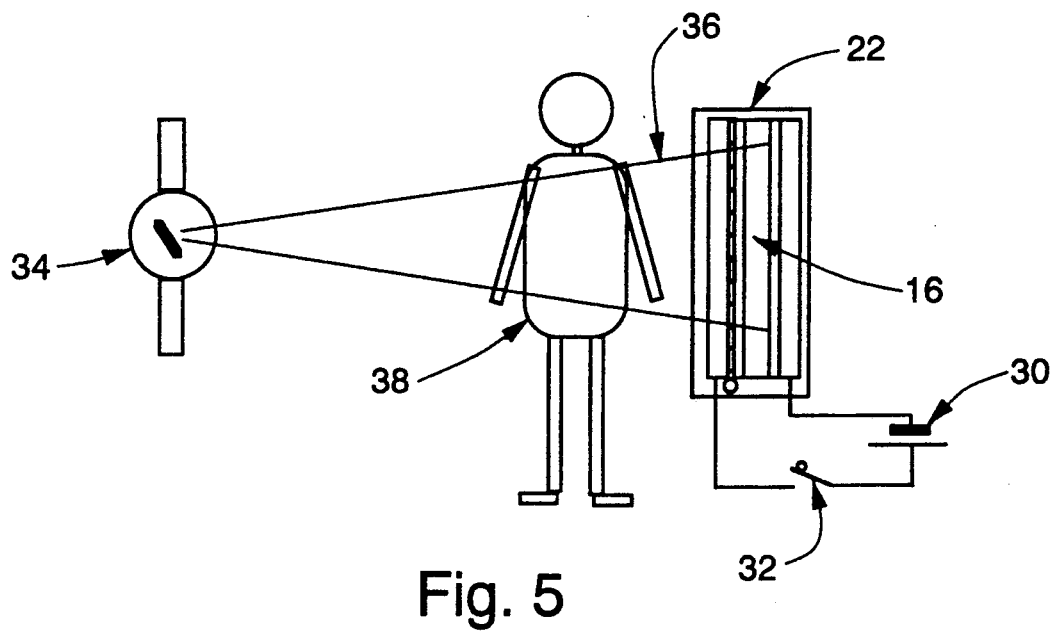
FIG. 5 shows in schematic representation an arrangement using the enclosure of FIG. 4 for capturing a latent X-ray image.

To obtain a latent radiographic image, the element 16 is placed in the cassette 22 as shown in FIG. 4, and the cassette 22 is placed in the path of information modulated X-ray radiation in a manner similar to the way a traditional cassette-photosensitive film combination is positioned. This arrangement is schematically depicted in FIG. 5 which shows a source of X-ray radiation 35, emitting a beam of X-rays. A target 38, i.e., a patient in the case of medical diagnostic imaging, is placed in the X-ray beam path. The emerging radiation through the patient is intensity modulated because of the different degree of X-ray absorption in the target 38. The modulated X-ray radiation beam 36 is then intercepted by the cassette 22 containing element 16. X-rays penetrate the enclosure 22 and are eventually absorbed by the photoconductive layer 8 altering its apparent resistivity in proportion to the radiation intensity along the X-ray paths therethrough. Viewed in a different way, the X-rays generate a flow of electron hole pairs, of which the electrons are accumulated in the interface between the photoconductive layer 8 and the dielectric layer 6. Switch 32 is closed during the exposure step in synchronization therewith or prior thereto, applying a bias D.C. voltage to the element.

After a predetermined first time period the X-ray flux is interrupted and X-rays no longer impinge on the element 16. The application of the bias voltage is then, either simultaneously or soon thereafter removed from the element 16, such as, by opening the switch 32.

Following removal of the bias voltage from the element 16, the layer 2 is moved away from contact with element 16 and the cassette 22 may then be opened. In the alternative, the cassette 22 may be so arranged that moving layer 2 away from contact with element 16 results in the removal of the bias voltage in a manner similar to that obtained through the action of switch 32.

The element 16 can now be handled in the presence of actinic radiation without loss of the stored image information contained in it as a charge distribution in the microcapacitors in the dielectric layer 6. Preferably at this point, the element 16 is intentionally exposed to a large dose of actinic radiation, as by a flash exposure, to eliminate the charges stored in the photoconductive layer 8, by momentarily rendering such photoconductive layer 8 substantially conductive. The layer 8 behaves as substantially conductive, because the abundant illumination produces an ample supply of electron hole pairs, in effect neutralizing any charges stored in the photoconductive layer 8.

Figure 6:
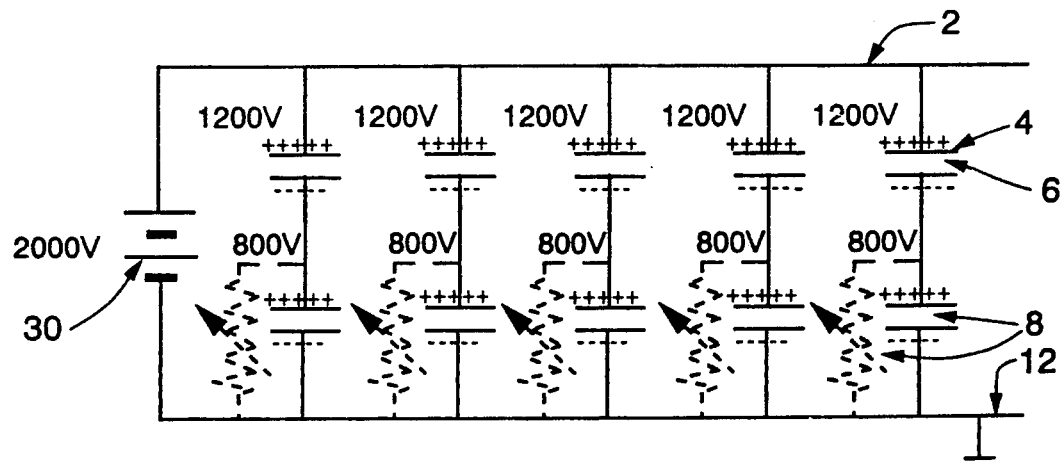
FIG. 6 represents an electrical equivalent of the element prior to exposure to x-ray radiation.

The combination of the dielectric and photoconductive layers 6 and 8 between the conductive microplates 4a, 4b, 4c, etc., and the backing layer 12, behave as two capacitors in series, one representing the dielectric, the other representing the photoconductor as shown in FIG. 6 which represents an equivalent electric circuit of the combination of the transparent electrode, the dielectric, the photoconductive and the backing conductive layers 4, 6, 8 and 10. In parallel with the photoconductor layer 8, there is shown a variable resistance in dotted lines representing the effect of the electron hole pair generation in the photoconductive layer 8.

When voltage supply 30 is connected across the element 16 as shown in FIG. 6, in the absence of actinic or X-ray radiation, the microcapacitors are all charged uniformly, the charge being a function of the capacitance of each capacitor. In the present case where all capacitors have the same area plates, the capacitance will depend on the plate separation and In the described structure this will result in two different voltages appearing across the capacitors, one in the capacitors representing the photoconductor layer 8, the other in the dielectric layer 6. If, for instance, the applied voltage difference from the bias source 30 is 2000 volts, it could be distributed across the two capacitors as 1200 volts across the dielectric layer 6 and 800 volts across the photoconductor layer 8.

Figure 7:
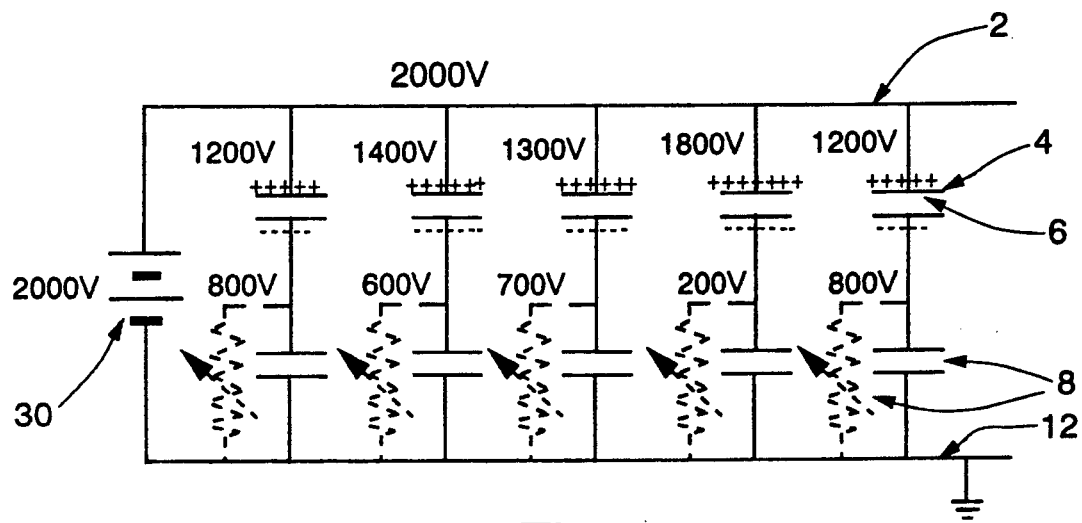
FIG. 7 represents an electrical equivalent of the element just after exposure to x-ray radiation.

When the element 16 is exposed to X-ray radiation, the overall voltage does not change, but because of the generation and movement of electron hole pairs, there is a new charge distribution in each of the microcapacitors, dependent on the radiation intensity incident on each of the microcapacitors, which produces a new voltage distribution between the two series connected microcapacitors. FIG. 7 shows schematically such a hypothetical consequential voltage redistribution.

When the X-ray exposure is terminated, the charges remain trapped in the microcapacitors. The optional charge barrier layer 10 in this case acts to assure that there is no charge leakage to equalize the charges over long periods of time.

Figure 8:
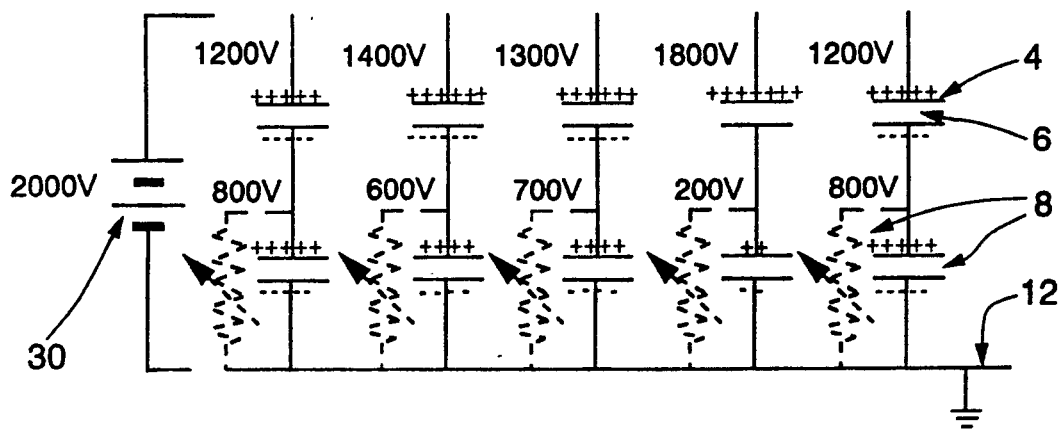
FIG. 8 represents an electrical equivalent of the element just after exposure to x-ray radiation and removal of the conductive, resilient contacting layer.

After termination of the X-ray exposure, the conductive contacting resilient layer 2 is moved to a position away from the microplates, 4a, 4b, etc., breaking contact therewith and removing the source 30 from the element 16. FIG. 8 shows the voltage distribution at this point. The charges having nowhere to go and remain fixed as they were at the end of the X-ray exposure time period. At this time the voltage source 30 may be completely removed from contact with the element 16 or the cassette 22.

Figure 9:
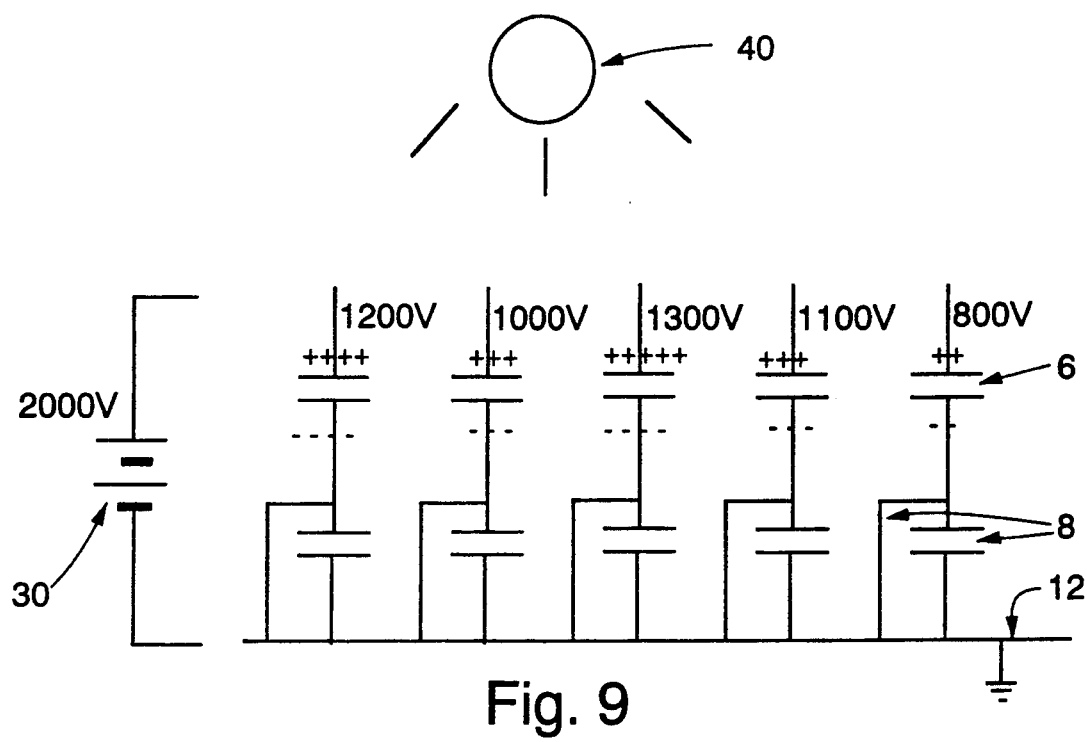
FIG. 9 represents an electrical equivalent of the element just after a uniform actinic exposure following exposure to x-ray radiation and removal of the bias source and of the conductive, resilient contacting layer.

The total voltage appearing across each capacitor pair is still 2000 volts. However, the charges in the dielectric portion of each capacitor are no longer uniform across the full surface of element 16, but vary, representing a latent radiographic image. In order to reduce the overall voltage, it one may opt at this stage to flash expose the element 16 with actinic radiation, as shown in FIG. 9. The result of such flash exposure, which is done in the absence of a bias voltage and with resilient conductive layer 2 moved away from contact with the microplates 4a, 4b, etc., is to discharge each of the microcapacitors representing the photoconductive layer 8 in essence bringing one end of each of the dielectric microcapacitors to essentially ground potential.

It is readily realized of course that the flash exposure, while preferably done using actinic radiation, can also be performed using additional, unmodulated X-ray radiation.

The voltages appearing across each capacitor in the dielectric layer 6 represent a latent radiographic image.

The element 16 may now be toned using an electrostatic toner. Toner adheres to charged areas in proportion to the intensity of the electrostatic field produced by the voltage distribution in the microcapacitors, rendering the latent image visible. Thus, the amount of toner adhering to each microplate is related to the X-ray intensity at that point. Further, the image resulting from toning all of the microplates 4a, 4b, 4c, etc., is a visible representation of the X-ray image resulting from the passage of the X-ray radiation through the target 38 and its subsequent impingement on the element 16.

The toned image may be viewed directly on the element 16, or preferably is transferred onto a receiving substrate for viewing. It is preferred that the toner use is colored black, and that the toned image be transferred onto a transparent substrate such as a polyethylene terephthalate base having a light blue tint. Such choice of materials results in images that have the same visual appearance as traditional radiograms and, as such, are easier for a technician to interpret.

Figure 11:
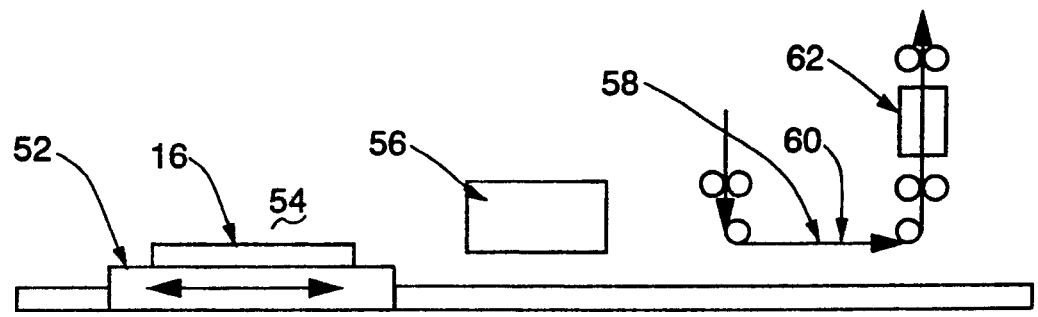
FIG. 11 is a schematic representation of toning apparatus useful in practicing this invention.

The transferred toner will usually be fixed onto the substrate using either heat or pressure or a combination of the two. Toner may be supplied in either liquid or powder form. An apparatus of the type schematically represented in FIG. 11 may be used to apply the toner particles and effectuate the image transfer. In that apparatus, the element 16 is shown mounted on a platen 52 which is adapted to move in reciprocal fashion through a loading station 54 where the element 16 may be mounted on or removed from the platen 52. The apparatus further comprises a toning station 56, where toner is applied to a surface of the element 16, and a transfer station 58, where the toner is transferred onto a substrate 60 and fixed thereon in a fixing station 62. The technology and associated apparatus for toning an element bearing an electrostatic charge distribution on its surface is well known, as is the technology and equipment for toner transfer and fixing. See, for example, *Electrophotography*, by R. M. Schaffert, Focal/Hastings House, N.Y. 2nd edition, particularly pages 37-44 relating to image development, pages 52-60 relating to image transfer, and pages 69-93 directed to toners, or the *Encyclopedia of Medical Devices and Instrumentation*, by J. G. Webster, Vol. 2 pages 1146 through 1168, reviewing Electroradiography by T. L. Thourson and L. S. Jeromin.

The above description of the manner in which a radiogram is captured by the element and rendered visible through toning has been set forth in a simple manner, yet with sufficient detail to enable an understanding of the underlying principles. The example and systems illustrated and discussed in this specification are intended to teach those skilled in the art the best ways known to the inventors to make and use their invention. Thus, the specific embodiments of this specification should be considered as illustrative rather than limiting the scope of the present invention. Many changes could be made by those skilled in the art to produce equivalent systems without departing from this invention.

What is claimed is:

1. A method for producing a radiograph using an X-ray image capture element, comprising:
    a first, electrically conductive, backing layer;
    a photoconductive layer responsive to both actinic and X-ray radiation extending substantially over said backing layer;
    a third, dielectric layer substantially transparent to both actinic and X-ray radiation, the dielectric layer having a back surface extending substantially over and in contact with said photoconductive layer and a front surface; and
    a plurality of discrete conductive microplates substantially transparent to both actinic and X-ray radiation, said microplates on said front surface, each of said microplates having dimensions coextensive with a minimum resolvable picture element; the method comprising:
    (a) preventing actinic radiation from impinging on the element;
    (b) applying an electric potential difference between the plurality of microplates and the backing layer;
    (c) impinging imagewise modulated X-ray radiation for a first time period onto the element;
    (d) after the first time period, stopping the applying step; and
    (e) toning the plurality of microplates with an electrostatic toner.

2. The method of claim 1, wherein step (d) further comprises after stopping the applying step, exposing the element to uniform actinic radiation for a second time period.

3. The method of claim 1 or 2, further comprising transferring the toner to a receiving surface.

4. The method of claim 1 or 2, further comprising fixing the toner after transferring the toner to the receiving surface.

5. The method of claim 1 or 2, further comprising transferring and fixing the toner onto a receiving surface comprising polyethylene terephthalate.

6. The method of claim 1 or 2, wherein the first electrically conductive, backing layer, and the second, photoconductive layer are transparent to actinic radiation.

7. The method of claim 1 or 2, wherein the first electrically conductive, backing layer, the second photoconductive layer, and the third dielectric layer are continuous layers.

* * * * *